US009736650B2

(12) United States Patent
Beaurepaire et al.

(10) Patent No.: US 9,736,650 B2
(45) Date of Patent: Aug. 15, 2017

(54) METHOD AND APPARATUS FOR ADAPTING NAVIGATION NOTIFICATIONS BASED ON COMPLIANCE INFORMATION

(71) Applicant: HERE Global B.V., Eindhoven (NL)

(72) Inventors: Jerome Beaurepaire, Berlin (DE); Philippe Beaurepaire, Lamballe (FR)

(73) Assignee: Here Global B.V., Eindhoven (NL)

( * ) Notice: Subject to any disclaimer, the term of this patent is extended or adjusted under 35 U.S.C. 154(b) by 125 days.

(21) Appl. No.: 14/660,095

(22) Filed: Mar. 17, 2015

(65) Prior Publication Data
US 2015/0276421 A1 Oct. 1, 2015

(30) Foreign Application Priority Data
Mar. 27, 2014 (FI) ..................... 20145283

(51) Int. Cl.
G01C 21/36 (2006.01)
H04W 4/02 (2009.01)

(52) U.S. Cl.
CPC ........ H04W 4/027 (2013.01); G01C 21/3629 (2013.01); G01C 21/3641 (2013.01); G01C 21/3697 (2013.01)

(58) Field of Classification Search
CPC .................. G01C 21/3655; G01C 21/3641
See application file for complete search history.

(56) References Cited

U.S. PATENT DOCUMENTS 5,904,728 A    5/1999  Tamai et al.
8,694,246 B2 * 4/2014  Yamakawa ............ G01C 21/00
                                                    701/410
9,086,294 B2 * 7/2015  Geelen ............... G01C 21/3641
9,086,297 B2 * 7/2015  Haleem .............. G01C 21/3697
9,189,959 B2 * 11/2015 Bank .................. G01C 21/3626
2008/0221792 A1 * 9/2008  Nakayama ......... G01C 21/3655
                                                    701/431
2008/0312766 A1   12/2008 Couckuyt
2009/0157294 A1   6/2009  Geelen et al.
(Continued)

FOREIGN PATENT DOCUMENTS

EP    1780508 A1   5/2007
EP    2096413 A1   9/2009
EP    2479538 A2   7/2012
(Continued)

OTHER PUBLICATIONS

Office action received for corresponding Finland Patent Application No. 20145283, dated Nov. 12, 2014, 7 pages.

Primary Examiner — Todd Melton
(74) Attorney, Agent, or Firm — Alston & Bird LLP

(57) ABSTRACT

An approach is provided for adapting navigation notifications based on a level of compliance of users to the notifications. An adaptation platform determines user action data following a presentation of at least one navigation notification at at least one device. The adaptation platform also processes the user action data to determine user compliance information with the at least one navigation notification. One or more presentation parameters for the presentation of the at least one navigation notification, content information for the at least one navigation information, or a combination thereof are then caused to be adapted based, at least in part, on the compliance information.

19 Claims, 9 Drawing Sheets

(56) References Cited

U.S. PATENT DOCUMENTS

2014/0052370 A1* 2/2014 Watanabe .......... G01C 21/3638
 701/428
2014/0214322 A1 7/2014 Tsimhoni et al.

FOREIGN PATENT DOCUMENTS

WO 96/24108 A1 8/1996
WO 2012/089282 A1 7/2012

* cited by examiner

FIG. 3
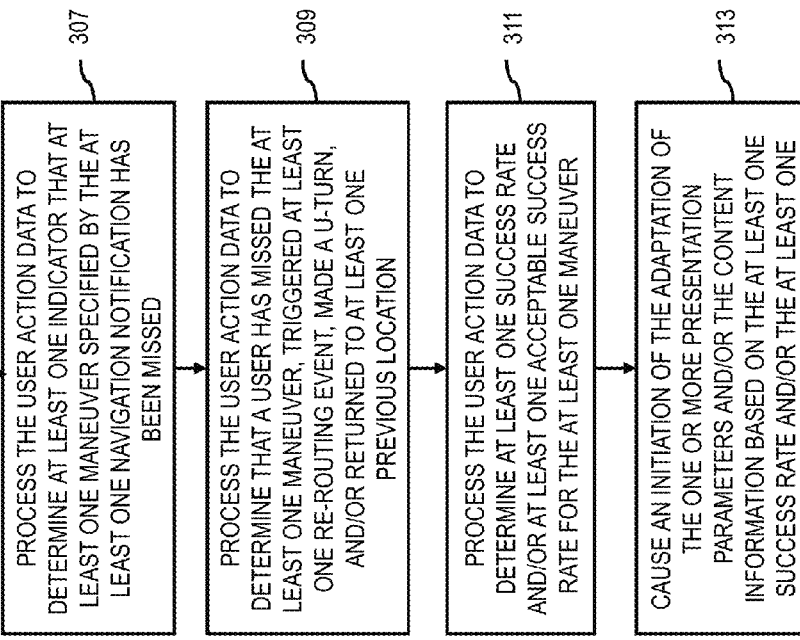
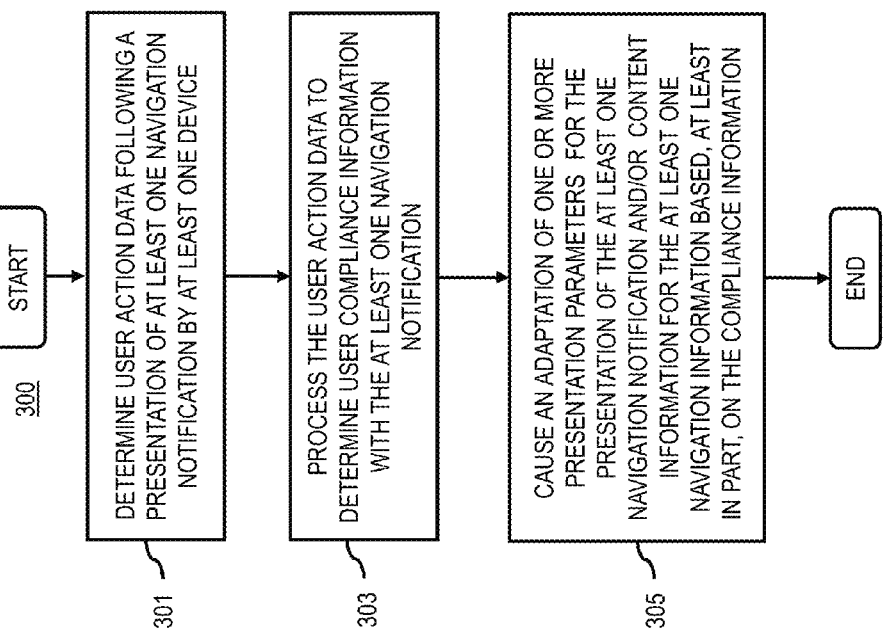

METHOD AND APPARATUS FOR ADAPTING NAVIGATION NOTIFICATIONS BASED ON COMPLIANCE INFORMATION

BACKGROUND

Service providers and device manufacturers (e.g., wireless, cellular, etc.) are continually challenged to deliver value and convenience to consumers by, for example, providing compelling network services. One area of interest has been the development of location-based services to provide users of mobile devices (e.g., mobile phones) tools for improving their driving experience. By way of example, many mobile devices are equipped with global positioning sensors and navigation and/or mapping applications for presenting location-based information to users. This information can be presented to the mobile device as one or more navigation notifications, i.e., timed visual and/or audio data for specifying one or more actions to be executed by the user. Unfortunately, the notifications are presented statically and therefore are not capable of being adapted based on the compliance of users that receive the notifications.

SOME EXAMPLE EMBODIMENTS

Therefore, there is a need for an approach for adapting navigation notifications based on a level of compliance of users to the notifications.

According to one embodiment, a method comprises determining user action data following a presentation of at least one navigation notification at at least one device. The method also comprises processing and/or facilitating a processing of the user action data to determine user compliance information with the at least one navigation notification. The method further comprises causing, at least in part, an adaptation of (a) one or more presentation parameters for the presentation of the at least one navigation notification, (b) content information for the at least one navigation information, or (c) a combination thereof based, at least in part, on the compliance information, wherein the adaptation is used for one or more subsequent presentations of the at least one navigation notification.

According to another embodiment, an apparatus comprises at least one processor, and at least one memory including computer program code for one or more computer programs, the at least one memory and the computer program code configured to, with the at least one processor, cause, at least in part, the apparatus to determine user action data following a presentation of at least one navigation notification at at least one device. The apparatus is also caused to process and/or facilitate a processing of the user action data to determine user compliance information with the at least one navigation notification. The apparatus is further caused to cause, at least in part, an adaptation of (a) one or more presentation parameters for the presentation of the at least one navigation notification, (b) content information for the at least one navigation information, or (c) a combination thereof based, at least in part, on the compliance information, wherein the adaptation is used for one or more subsequent presentations of the at least one navigation notification.

According to another embodiment, a computer-readable storage medium carries one or more sequences of one or more instructions which, when executed by one or more processors, cause, at least in part, an apparatus to determine user action data following a presentation of at least one navigation notification at at least one device. The apparatus is also caused to process and/or facilitate a processing of the user action data to determine user compliance information with the at least one navigation notification. The apparatus is further caused to cause, at least in part, an adaptation of (a) one or more presentation parameters for the presentation of the at least one navigation notification, (b) content information for the at least one navigation information, or (c) a combination thereof based, at least in part, on the compliance information, wherein the adaptation is used for one or more subsequent presentations of the at least one navigation notification.

According to another embodiment, an apparatus comprises means for determining user action data following a presentation of at least one navigation notification at at least one device. The apparatus also comprises means for processing and/or facilitating a processing of the user action data to determine user compliance information with the at least one navigation notification. The apparatus further comprises means for causing, at least in part, an adaptation of (a) one or more presentation parameters for the presentation of the at least one navigation notification, (b) content information for the at least one navigation information, or (c) a combination thereof based, at least in part, on the compliance information, wherein the adaptation is used for one or more subsequent presentations of the at least one navigation notification.

In addition, for various example embodiments of the invention, the following is applicable: a method comprising facilitating a processing of and/or processing (1) data and/or (2) information and/or (3) at least one signal, the (1) data and/or (2) information and/or (3) at least one signal based, at least in part, on (or derived at least in part from) any one or any combination of methods (or processes) disclosed in this application as relevant to any embodiment of the invention.

For various example embodiments of the invention, the following is also applicable: a method comprising facilitating access to at least one interface configured to allow access to at least one service, the at least one service configured to perform any one or any combination of network or service provider methods (or processes) disclosed in this application.

For various example embodiments of the invention, the following is also applicable: a method comprising facilitating creating and/or facilitating modifying (1) at least one device user interface element and/or (2) at least one device user interface functionality, the (1) at least one device user interface element and/or (2) at least one device user interface functionality based, at least in part, on data and/or information resulting from one or any combination of methods or processes disclosed in this application as relevant to any embodiment of the invention, and/or at least one signal resulting from one or any combination of methods (or processes) disclosed in this application as relevant to any embodiment of the invention.

For various example embodiments of the invention, the following is also applicable: a method comprising creating and/or modifying (1) at least one device user interface element and/or (2) at least one device user interface functionality, the (1) at least one device user interface element and/or (2) at least one device user interface functionality based at least in part on data and/or information resulting from one or any combination of methods (or processes) disclosed in this application as relevant to any embodiment of the invention, and/or at least one signal resulting from one or any combination of methods (or processes) disclosed in this application as relevant to any embodiment of the invention.

In various example embodiments, the methods (or processes) can be accomplished on the service provider side or on the mobile device side or in any shared way between service provider and mobile device with actions being performed on both sides.

For various example embodiments, the following is applicable: An apparatus comprising means for performing the method of any of originally filed claims 1-9, 21-29, and 44-46.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings:

FIGS. 3 and 4 are flowcharts of processes for adapting navigation notifications based on a level of compliance of users to the notifications, according to various embodiments;

DESCRIPTION OF SOME EMBODIMENTS

Examples of a method, apparatus, and computer program for adapting navigation notifications based on a level of compliance of users to the notifications are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

Figure 1:
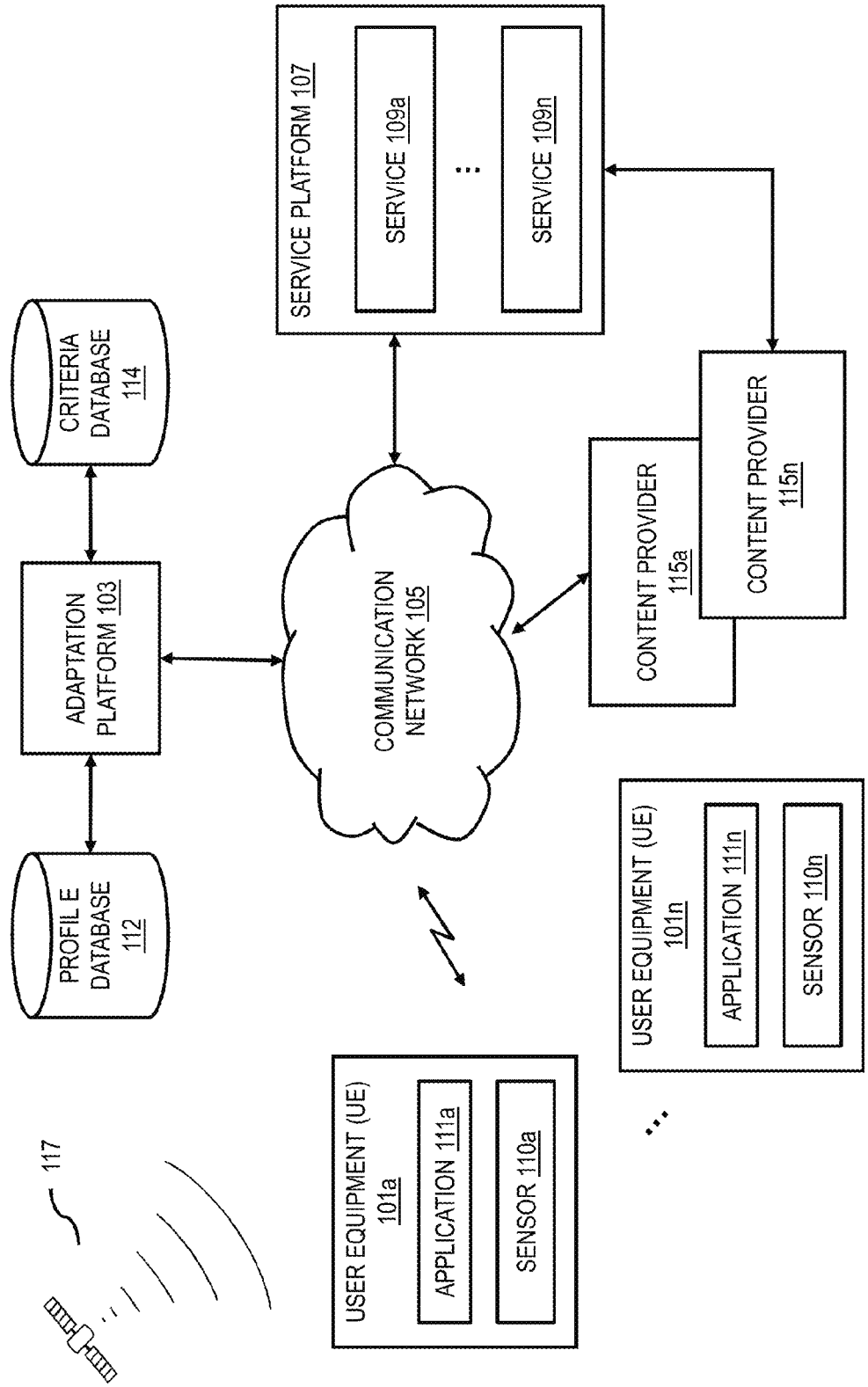
FIG. 1 is a diagram of a system for adapting navigation notifications based on a level of compliance of users to the notifications, according to one embodiment.

FIG. 1 is a diagram of a system for adapting navigation notifications based on a level of compliance of users to the notifications, according to one embodiment. As previously discussed, service providers and device manufactures are increasingly interested in developing location-based services to provide users of mobile devices (e.g., mobile phones) with useful tools for navigating to destinations, improving the quality of their travels, etc. Further, it is increasingly popular for service providers and device manufacturers to bundle or make available navigation and/or mapping services on an array of user devices. These devices may utilize location-based technologies (e.g., Global Positioning System (GPS) receivers, cellular triangulation, assisted-GPS (A-GPS), etc.) to provide a user with navigation notifications, such as turn-by-turn directions, point of interest data, maps, graphic elements, travel details, navigation instructions, venue information and any other information for supporting and/or fulfilling a navigation request and/or location based service request. The navigation notifications may be presented visually, audibly or virtually via the mobile device and are usually timed for execution based on the distance of the device from a point along the navigation route, an expected time of arrival of the mobile device to a point along the navigation route or other predetermined criteria. For the purpose of illustration herein, the presenting of the navigation notifications may include any means of rendering, conveying and/or displaying notifications to the user and/or to a user device associated with the user.

By way of example, in the case where a user is travelling along a freeway in route to a destination, a navigation notification for indicating an impending exit the user is to employ may be timed for presentment when the mobile device is within 500 feet of the exit, two minutes prior to the expected time of arrival to the exit (e.g., based on current speed and distance of travel), etc. Likewise, a second navigation notification may be timed to automatically occur when the mobile device is determined to be within 150 feet of, or 30 seconds away from, the suggested exit. Hence, navigation notifications are typically presented and/or rendered to a mobile device as static messages with narrowly defined presentment parameters. This approach limits the dynamic capacity of location based services as they are unable to adapt the timing, pace or means of presentment and/or rendering of navigation notifications to account for circumstances affecting the route being navigated.

Still further, users of navigation applications may not comply with a suggested navigation notification for various reasons (other than discretion). For instance, a user may accidentally miss an exit or fail to perform a suggested maneuver due to improper timing of presentment of a navigation notification or inaccurate information (e.g., improper exit name being announced due to data lag). As another example, users may experience driving conditions that limit their ability to comply with a maneuver such as missing or poorly placed signage for identifying the point in question, poor lighting conditions at the point in question, physical obstructions that limit user visibility (e.g., trees, snow), etc. Unfortunately, current location based services and applications do not support the adapting of navigation notifications to account for user needs and driving conditions that impact adherence to a recommended maneuver. Thus, even when a preponderance of users fail to comply with a navigation notification related to a common location, the timing and execution of the notification remains unchanged for subsequent users. There is currently no convenient means of translating feedback regarding the response of users to the presentment of a notification into useful adapted content, instructions, visual elements, audio elements, etc.

To address this problem, system 100 of FIG. 1 enables a location based service, such as a navigation application and/or system, to adapt navigation notifications rendered and/or presented to user equipment (UE) 101*a*-101*n* based on user compliance information collected in association with users. This may include adapting navigation notifications for a specific user, such as based on compliance information for the user for a specific location. This may also include the adapting of navigation notifications based on compliance information relating to a group of users for a specific location and/or navigation notification. The user compliance information may include data for indicating a level of adherence to, response to or employment of a routing instruction, maneuver or other action suggested to the users per the navigation notification. Per this approach, the compliance information may be used as feedback by a navigation service, location based service provider, application provider, content provider, or the like for: (1) determining the effectiveness of navigation notifications, the accuracy of the location based information or the like and (2) adapting subsequent renderings of the navigation notifications.

In one embodiment, system 100 includes an adaptation platform 103 that may be configured to interface directly with a service platform 107 that provides various location based services 109*a*-109*n* (also collectively referred to as services 109). In addition, the adaptation platform 103 may interface with one or more content providers 115*a*-115*n* (also collectively referred to as content providers 115) that provide/deliver content of various types and genres (e.g., navigation content, travel content, locality content, marketing content) upon request. Requests may be initiated via communication network 105 by way of one or more location based applications 111*a*-111*n* (also collectively referred to as applications 111) of user equipment (UE) 101*a*-101*n* (also collectively referred to as UE 101) belonging to users. The applications 111 may access turn-by-turn navigation, routing information, maps, driving instructions, etc., upon which navigation notifications may be based. In addition, the applications 111 may access venue information, point of interest information, community information, shopping information and any other data associated with a location.

The applications 111 operate with the service platform 107 based on the function to be performed. For example, in the case of a navigation request, a navigation service is accessed for facilitating generation of navigation notifications that guide the user to a desired destination. In the case of a shopping search request, a shopping or business directory service may be employed by the application 111 for enabling the identification of local shops that meet search criteria or user preferences. Notifications generated pursuant to the shopping search request may include instructions for navigating to an identified shop or may convey product or sale information associated with the current location of the user. It is noted that the adaptation platform 103 may therefore support the adapting of any type of notification wherein location information is relied upon.

By way of example, the adaptation platform 103 may be implemented as a cloud based service, hosted platform or the like for exchanging as well as receiving information from the services 109, providers 115 or applications 111. Alternatively, the adaptation platform 103 may be directly integrated for processing data generated and/or provided by the services 109, providers 115 or applications 111. Per this integration or interface, the adaptation platform 103 may translate location based information, content or the like as generated and exchanged during a navigation session into an adapted navigation notification accordingly.

In one embodiment, the adaptation of a navigation notification may include, for example, changing the pace and frequency of notifications to account for a pattern of missed exits by one or more users. The adaptation may also include altering the means and/or mode of presentment of a navigation notification. For example, increasing the volume of the notification, causing a flashing of the notification, causing a vibrating of the mobile device or any other signaling means, increasing the size of graphical or textual elements or the like. In addition, the navigation notifications may be presented virtually, such as in accordance with an augmented reality mode of operation of the application 111. Hence, the adaptation platform 103 may support the adapting of navigation notifications according to various formats and presentment modes.

Still further, the adaptation platform 103 may support the adapting of a notification generated as a result of the UE 101 interfacing with an electronic system of the vehicle (e.g., audio system, dashboard or windshield display system). Moreover, the UE 101 may be an embedded system of the vehicle directly. For example, it is contemplated in future embodiments, that the navigation notifications may be rendered to a driving system of a vehicle for adapting a driving pattern of a self-driving (autonomous) vehicle, rendered to an external display system for adapting content displayed to the driver as they navigate a path of travel, etc.

In one embodiment, the adaptation platform 103 is configured to analyze user actions performed in response to a navigation notification being conveyed (e.g., to a display of the UE 101). The analysis may include processing sensor or probe information, as collected by one or more sensors 110*a*-110*n* (also collectively referred to as sensors 110) of the UE 101 of the user, to determine an action performed in response to a navigation notification. For example, the UEs 101 may utilize the sensors as GPS receivers for interacting with one or more satellites 117. The sensors may also be used to perform cellular triangulation, assisted-GPS, or other location based techniques for determining the geographic coordinates of a UE 101. In addition, the sensors 110 may be used to gather temporal, spatial or environmental information regarding the UEs 101. By way of example, the sensors may detect speed and location data, tilt data (e.g., a degree of incline or decline of the vehicle along a path of travel), motion data, light data, sound data, image data, weather data and the like.

Still further, the sensors 110 may detect local or transient network and/or wireless signals, such as those transmitted by nearby devices during navigation of a vehicle associated with the user. This may include, for example, network routers as configured within a premise (e.g., home or business) or other UE 101 encountered during navigation to or within range of the point of interest. Other signals detected may include those transmitted by traffic related objects such as traffic lights, traffic cameras, signals, digital signage or the like. It is noted that, in certain implementations, the sensors of the vehicle may be configured to interact with the sensors 110 of the UE 101 for enabling data exchange and interaction. This exchange may be facilitated by way of any known or still developing range based or wireless communication protocols.

By way of example, in the case of a turn being suggested, the adaptation platform 103 may process change of speed data, change of direction/bearing data, geo-coordinate data, device interaction data, location trace data and other information per the sensors 111. In some instances, statistics, data and other metrics collected via the satellites 117 or services 109 may also be acquired. It is noted that any contextual information pertaining to the interaction of the user with the UE 101, with a vehicle, with other UE or the like may be acquired and subsequently analyzed for determining a user action performed subsequent to a navigation notification.

In one embodiment, the adaptation platform 103 processes the user action data to determine compliance information to associate with a user in response to a navigation notification. The compliance information may include any data for indicating or classifying (e.g., by type) a user action performed, whether said action was in alignment with a navigation notification, a level of compliance (alignment) of the user or UE 101 to the navigation notification, etc. By way of example, the adaptation platform 103 compares actual (collected) location data, direction data, bearing data or other sensed information representative of a user action against expected location, direction, bearing, etc., pursuant to the navigation notification. As another example, the adaptation platform 103 may determine one or more events representative of a user action performed subsequent to conveyance of a navigation notification; events which may indicate whether the user complied with the navigation notification. This includes, for example, identifying the triggering of at least one re-routing event, the requiring of the user to perform a U-turn or the requiring of the user to return to at least one previous location.

In one embodiment, when the compliance information indicates a discrepancy is determined, the adaptation platform 103 may flag the user action as non-compliant. In contrast, when the compliance information is indicative of no discrepancy, the user action may be flagged as compliant. It is noted that the determination of compliance or non-compliance may be based on a predetermined compliance threshold (e.g., a success rate), i.e., an extent to which the user action performed matches the expected user action. The compliance threshold may be established as criteria, via a criteria database 114, for enabling the compliance determination per the user action data. Per this approach, for example, an 80% compliance threshold requires the coordinates, speed, motion data, bearing information and other data collected per the user action be at least an 80% match to the expected data in order to be deemed compliant. In this example, the extent of the match may also be associated with or indicate a level of compliance (e.g., a 90% match may indicate a higher level of compliance). The threshold may be adapted accordingly to affect the level of variance allowed for establishing the compliance information. This threshold may also affect the level of sensitivity of the adaptation platform 103 to user actions that trigger adaptations of subsequent navigation notifications.

In one embodiment, a profile database 112 is maintained by the platform 103 for storing the compliance information in conjunction with profile data of a user. As such, the outcome of one or more user actions performed—i.e., the level of compliance—is maintained as a history of responses to a specific navigation notification. The profile information may also specify user identification information for uniquely identifying the UE 101 and/or the user associated with a navigation notification and/or corresponding location based request. Hence, compliance information may be associated with a specific user to support the adapting of navigation notifications for only that user—i.e., the navigation notifications may be customized for the user rather than generalized for a group of user. For example, if a particular user tends to miss a recommended turn, subsequent navigation notifications for the user may be adapted to enable more effective alerting of the user of the turn. This may include increasing the frequency of notification, the voice guidance type, causing a vibration of the UE 101, etc.

In addition, the profile may specify one or more permissions, including permission for the adaptation platform 103 to acquire sensor information related to the UE 101 via sensors 110 during navigation. As such, contextual information regarding the user or UE 101 may be acquired for supporting further customization of a navigation notification for a user. Preferences may also be specified for indicating a preferred mode or means of adaptation of a navigation notification, including a sound intensity to associate with a notification, a vibration mode of operation to associate with a notification, a light intensity to associate with a notification, a sound type to associate with a notification, etc. Hence, the user may indicate a level of detail for presentment and/or rendering of content information regarding navigation notifications. The adaptations performed by the adaptation platform 103 may be based on acquired compliance information for a group of users or a specific user for impacting the navigation notifications presented to users.

It is noted that, in instances where no formal registration is performed by a user with respect to the adaptation platform 103, the application 111 or services 109, a temporary or dummy profile may be maintained by the adaptation platform 103. Alternatively, a map area or location based profile may be maintained respective to the location of the navigation notification. For example, a map area profile may correspond to specific map areas, such as crossings, junctions, exits, etc., as opposed to being associated with a specific user and/or user profile. As such, compliance information acquired for unregistered users is still able to be associated with a particular navigation notification, location or a combination thereof. Per this approach, the user of UE 101 performs no registration but consents to the sharing of user interaction data, i.e., via the application 111. The adaptation platform 103 then aggregates compliance information based on the aggregated user interaction data automatically (e.g., in the background).

In one embodiment, the adaptation platform 103 determines, based on the compliance information, whether a navigation notification should be adapted. In addition, the adaptation platform 103 may be configured to initiate execution of an adaptation for subsequent rendering and/or presentation at a UE 101. For example, in the case where the compliance level for one or more users with respect to a particular navigation notification (e.g., suggested maneuver for a specific location) is low, this may cause the adaptation platform 103 to adapt subsequent instances of the navigation notification. As another example, the adaptation may be caused to occur when a preponderance of users are shown to not comply with a given navigation instruction—i.e., corresponding to a statistical analysis based on multiple user feedback. Still further, an adaptation may be triggered to occur as a result of a compliance level associated with a map area profile. The thresholds and/or conditions for enabling the adaptation may be established as criteria for affecting triggering of an adaptation. For example, the criteria may specify a minimum threshold of compliance (e.g., less than 80% compliance may be deemed unacceptable) and/or a minimum number of users (e.g., at least 50) that are out of compliance. As another example, the criteria may specify a minimum frequency of non-compliance that must occur (e.g., missed maneuvers must occur within one hour) or a minimum range of correlation of one or more occurrences (e.g., U-turns must have occurred within 100 feet of one another).

Still further, the criteria may specify additional conditions to be accounted for as well as one or more analytic procedures to be performed in response to one or more user actions and/or instances of non-compliance. This may include, for example, processing the user action data against weather data, traffic data, environmental data and the like. Per this approach, the adaptation platform 103 is able to distinguish instances of intermittent non-compliance—i.e., those arising from weather or traffic related visibility conditions—versus those instances of non-compliance that are indicative of a consistent pattern.

It is noted that by aggregating compliance information over time, the adaptation platform 103 may determine or "learn" of a typical compliance level associated with a navigation notification. This persistent monitoring and learning may enable the adaptation platform 103 to adapt the navigation notifications and thus account for changing environmental, topographical, geological, societal or natural conditions that impact the ability of a user to comply with a navigation instruction. Also of note, this information may be utilized by a navigation service provider or location based data service to increase the accuracy of their location based information. Moreover, the compliance threshold (e.g., success rate) may be adapted accordingly based on the continual aggregation of user action data.

In one embodiment, the adaptation platform 103 may cause the generating of an adaptation or one or more instructions for representing the adapted navigation notifications. By way of example, the instructions may be associated with, or in the form of, application programming interface (API) routines for affecting the representation of graphical, textual and visual elements to a display of the UE 101. As another example, the adaptation may correspond to generation of audible data or virtual elements. It is noted that any means by which the instructions may be conveyed directly to the application 111 or the services 109 for affecting the presentment of content regarding navigation notifications may be employed herein.

By way of example, the communication network 105 of system 100 includes one or more networks such as a data network, a wireless network, a telephony network, or any combination thereof. It is contemplated that the data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks, code division multiple access (CDMA), wideband code division multiple access (WCDMA), wireless fidelity (WiFi), wireless LAN (WLAN), Bluetooth®, Internet Protocol (IP) data casting, satellite, mobile ad-hoc network (MANET), and the like, or any combination thereof.

The UE 101 is any type of mobile terminal, fixed terminal, or portable terminal including a mobile handset, station, unit, device, multimedia computer, multimedia tablet, Internet node, communicator, desktop computer, laptop computer, notebook computer, netbook computer, tablet computer, personal communication system (PCS) device, personal navigation device, personal digital assistants (PDAs), audio/video player, digital camera/camcorder, positioning device, television receiver, radio broadcast receiver, electronic book device, game device, or any combination thereof, including the accessories and peripherals of these devices, or any combination thereof. It is also contemplated that the UE 101 can support any type of interface to the user (such as "wearable" circuitry, etc.).

By way of example, the UEs 101, adaptation platform 103, the service platform 107, and the content providers 115 communicate with each other and other components of the communication network 105 using well known, new or still developing protocols. In this context, a protocol includes a set of rules defining how the network nodes within the communication network 105 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application (layer 5, layer 6 and layer 7) headers as defined by the OSI Reference Model.

Figure 2:
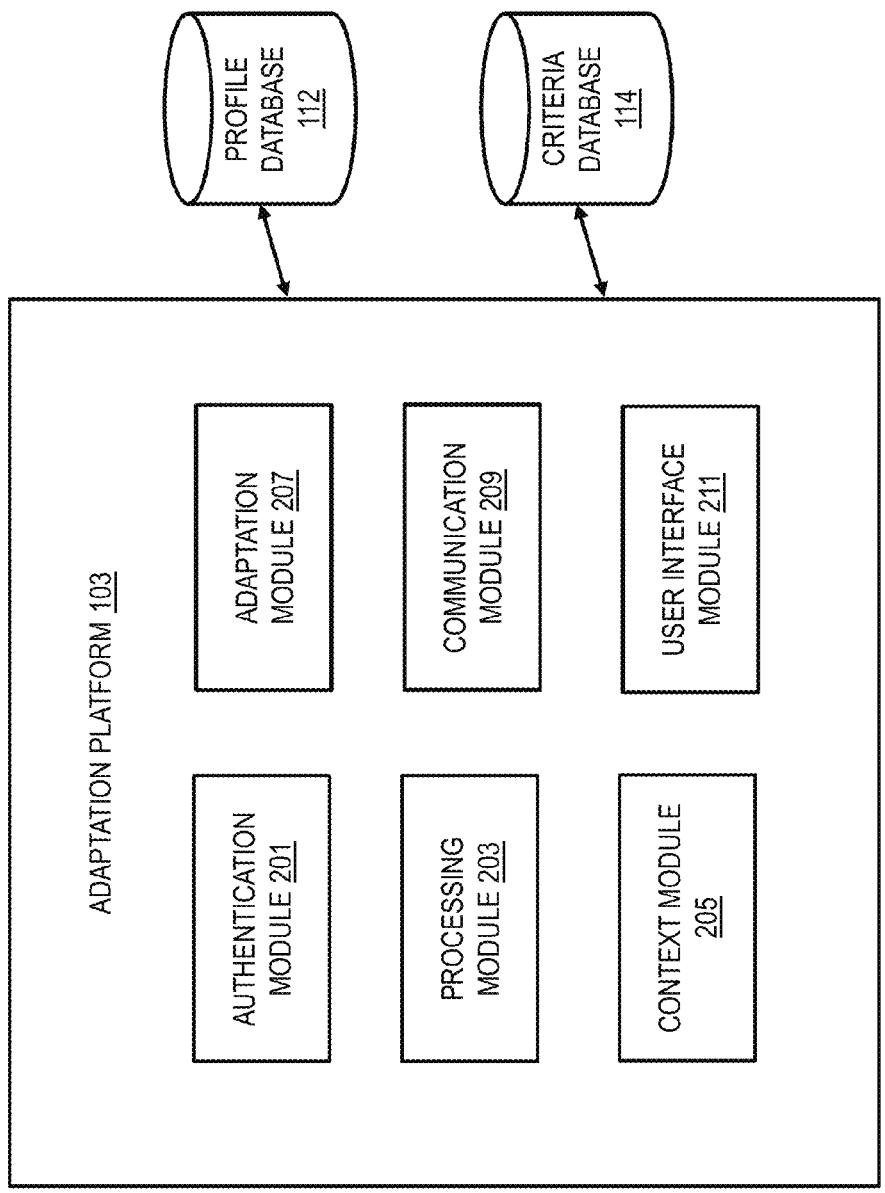
FIG. 2 is a diagram of the components of an adaptation platform, according to one embodiment.

FIG. 2 is a diagram of the components of the adaptation platform 103, according to one embodiment. By way of example, the adaptation platform 103 includes one or more components for adapting navigation notifications based on a level of compliance of users to the notifications. It is contemplated that the functions of these components may be combined in one or more components or performed by other components of equivalent functionality. In this embodiment, the adaptation platform 103 includes an authentication module 201, a processing module 203, a context module 205, an adaptation module 207, a communication module 209 and a user interface module 211.

The authentication module 201 authenticates users and user devices 101a-101n for interaction with the adaptation platform 103. By way of example, the authentication module 201 receives a request to subscribe to the adaptation platform 103 via an application 111. The subscription process may correspond to the time of subscription, download or integration of the application 111 at the UE 101. Preferences and settings information, including a preference for a special alarm message or preferred vibration mode to be activated for alerting purposes (e.g., intermittent versus continual vibration).

The authentication process performed by the module 201 may also include receiving and validating a login name and/or user identification value as provided or established for a particular user during a subscription or registration process with the service provider. The login name and/or user identification value may be received as input provided by the user from the user device 101 or other device via a graphical user interface to the platform 103 (e.g., as enabled by user interface module 215). Profile information, per database 112, may be cross referenced as part of the login process. Alternatively, the login process may be performed through automated association of profile data for the user and/or UE with an IP address, a carrier detection signal of a user device, mobile directory number (MDN), subscriber identity module (SIM) (e.g., of a SIM card), radio frequency identifier (RFID) tag or other identifier.

The processing module 203 processes user action data to determine user compliance information with the at least one navigation notification. In addition, the processing module 203 determines/generations compliance information regarding a user with respect to a navigation notification. This includes, for example, processing sensor or probe information, as collected by one or more sensors 110 of the UE 101 and passed to the context module 203. As another example, the module 203 may process change of speed data, change of direction/bearing data, geo-coordinate data, device interaction data, location trace data and other information for representing an action performed by a user subsequent to a navigation notification.

Still further, in certain instances, processing module 203 may interact with the communication module 207 to access statistics, data and other metrics collected via the satellites 117 or services 109 employed to facilitate a location based service request. It is noted that the processing module 203 may also operate in conjunction with the context module 205 for processing any contextual information pertaining to the interaction of the user with the UE 101, with a vehicle, with other UE or the like.

The processing module 203 may also process user action data to determine compliance information to associate with a user in response to a navigation notification. By way of example, the processing module 203 may compare actual (collected) user action data against expected user action data pursuant to the navigation notification. The module 203 then determines, based on criteria maintained via a criteria database 114, whether the user action data is indicative of compliance or non-compliance on the part of the user with the navigation notification, the extent and/or level of compliance, or a combination thereof. The compliance information is stored in connection with the profile of the corresponding user by way of the authentication module 201 accordingly.

The context module 205 may process contextual information associated with one or more users, UE 101 or other devices or vehicles associated with user navigation. For example, the contextual information may seat sensor information, environmental condition information, obstruction information and any other data capable of acquisition by way of the services 109 and sensors of the UE 101 and/or vehicle. The context module 205 may also provide information to the processing module 203 for determining whether a particular event has occurred, such as whether the user has surpassed a recommended exit, had to make a U-turn, etc.

The adaptation module 207 determines, based on the compliance information, whether a navigation notification should be adapted. In addition, the module 207 may be configured to initiate execution of an adaptation for subsequent rendering and/or presentation at a UE 101. By way of example, the adaptation may be caused to occur based on criteria and/or one or more conditions being met, i.e., when a preponderance of users are shown to not comply with a given navigation instruction. Also, the module 207 may process the user action data against weather data, traffic data, environmental data and the like. Per this approach, the module 207 may further distinguish between persistent and intermittent instances of non-compliance.

The user interface module 211 operates in connection with the adaptation module 207 to affect the presentment and/or rendering of information to a user interface of the application 111. The user interface module 211 may receive instructions from the adaptation module 207 for reflecting how an adaptation is to be rendered to the UE. This may include, for example, controlling the pace and frequency of presentment of notifications. As another example, the means and/or mode of presentment may be controlled to affect the volume of a notification, cause a flashing of a notification, cause a vibrating of the UE, etc. In certain implementations, the module 211 may support the adapting of navigation notifications according to various formats and presentment modes. Of note, the user interface module 211 may operate in connection with the communication module 209 for facilitating the exchange of location based information via the communication network 105 for rendering and/or presenting adapted navigation notifications.

The above presented modules and components of the adaptation platform 103 can be implemented in hardware, firmware, software, or a combination thereof. Though depicted as a separate entity in FIG. 1, it is contemplated that the platform 103 may be implemented for direct operation by respective UEs 101. As such, the adaptation platform 103 may generate direct signal inputs by way of the operating system of the UE 101 for interacting with the application 111. In another embodiment, one or more of the modules 201-211 may be implemented for operation by respective UEs as a platform 103, cloud based service, or combination thereof.

Figure 4:
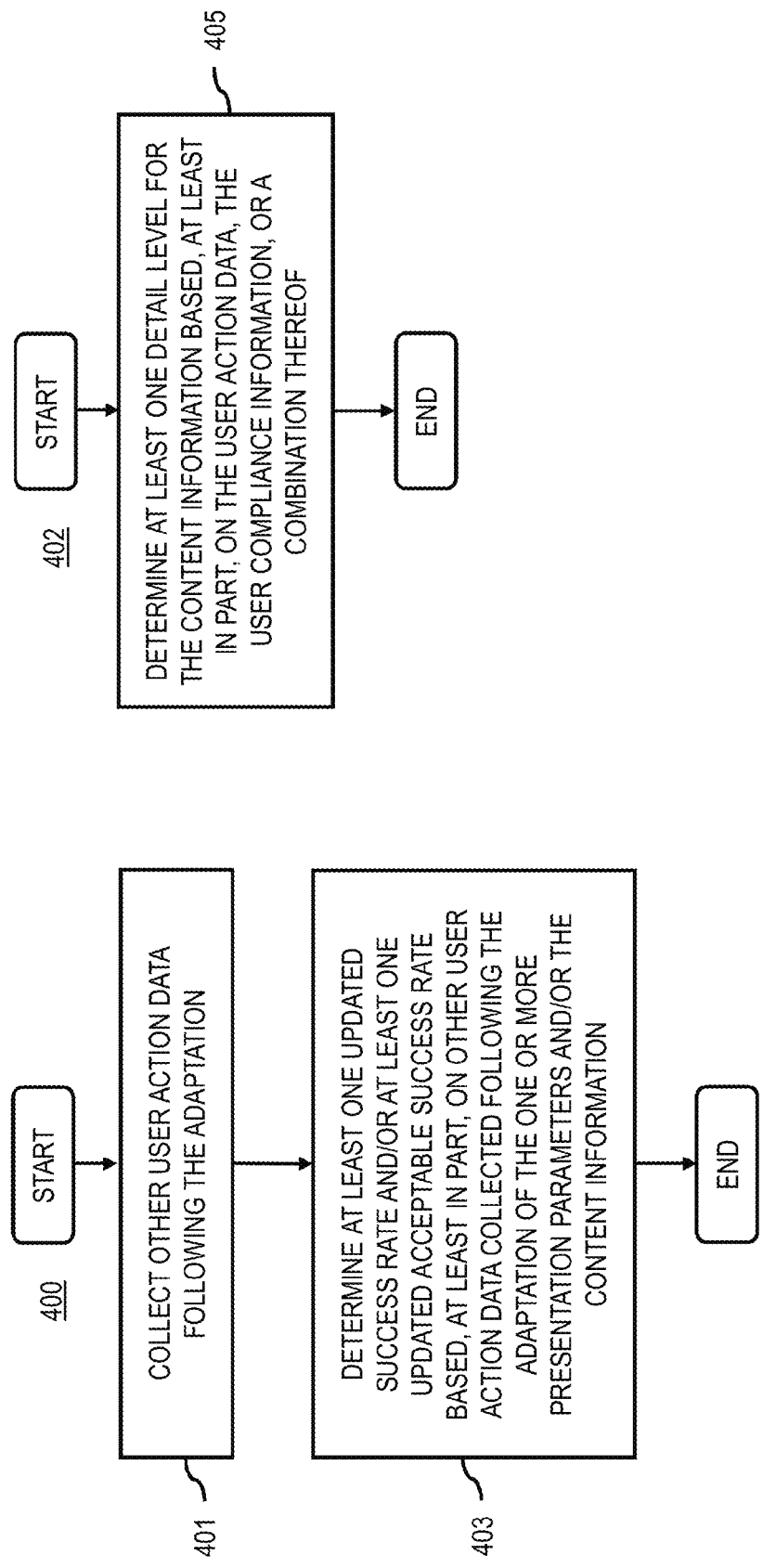
Figure 7:
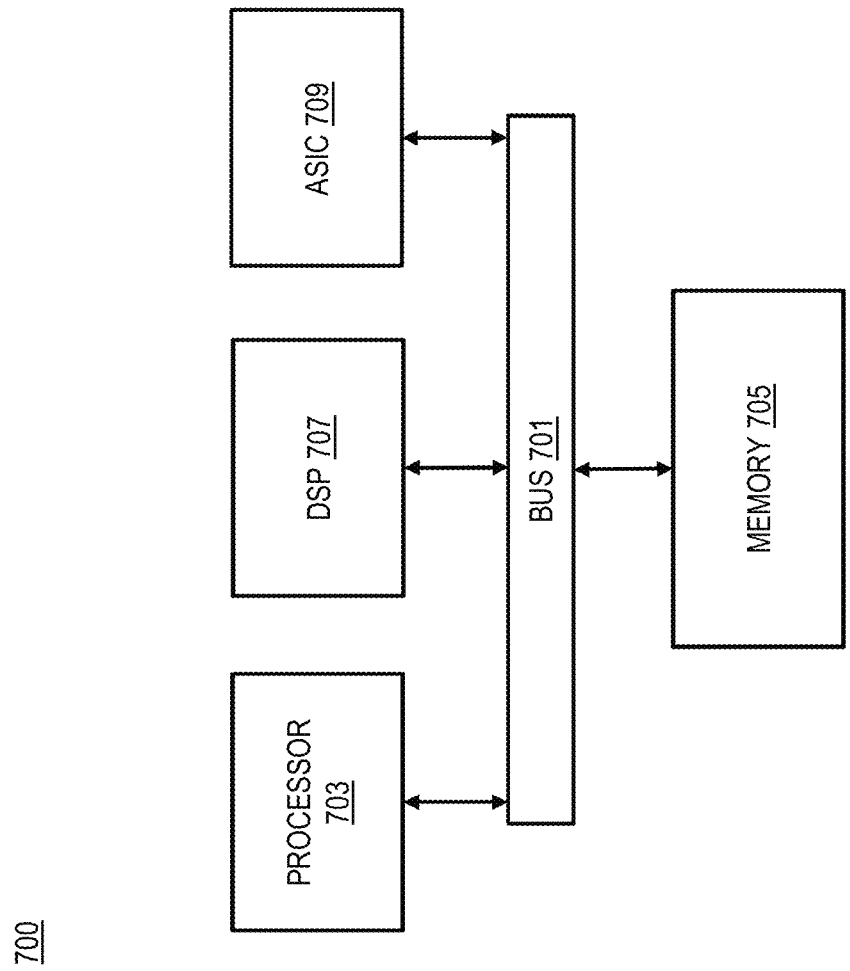
FIG. 7 is a diagram of a chip set that can be used to implement an embodiment of the invention.

FIGS. 3 and 4 are flowcharts of processes for adapting navigation notifications based on a level of compliance of users to the notifications, according to various embodiments. In one embodiment, the adaptation platform 103 performs processes 300, 302, 400 and 402 and is implemented in, for instance, a chip set including a processor and a memory as shown in FIG. 7.

In step 301 of process 300, the adaptation platform 103 determines user action data following a presentation of at least one navigation notification by at least one device. As noted, the user action data may include any information representing the movement, speed, maneuvering or execution of the user and/or UE 101. In addition, the user action data may include at least in part, dynamic location data (e.g., probe data that indicates location traces, heading, speed, etc.) associated with the at least one device, data indicating one or more user interactions with the at least one device, or a combination thereof. In step 303, the platform 103 processes the user action data to determine user compliance information with the at least one navigation notification. This may include determining a level of compliance (e.g., a success rate), a category of compliance and/or user action type, etc. The user compliance information may include data for indicating a level of adherence to, response to or employment of a routing instruction, maneuver or other action suggested to the user per the navigation notification In step 305, the platform 103 causing, at least in part, an adaptation of (a) one or more presentation parameters for the presentation of the at least one navigation notification, (b) content information for the at least one navigation information, or (c) a combination thereof based, at least in part, on the compliance information. This may include, for example, adapting the timing, color, size, etc., of content for affecting the presentment of subsequent navigation notifications.

In step 307 of process 302, the adaptation platform 103 processes the user action data to determine at least one indicator that at least one maneuver specified by the at least one navigation notification has been missed. The user compliance information may be based on the at least one indicator. In another step 309, the platform 103 processes the user action data to determine that a user has missed the at least one maneuver, triggered at least one re-routing event, made a U-turn, returned to at least one previous location, or a combination thereof. It is noted that the indicator may correspond to the missed maneuver, the triggered re-routing event, etc.

Per step 311, the platform 103 processes the user action data to determine at least one success rate, at least one acceptable success rate, or a combination thereof for the at least one maneuver. By way of example, the success rate may correspond to the actual rate (as determined for the user in response to a navigation notification. The acceptable success rate may correspond to an extent of correlation or match of a user action as based on the threshold or other predetermined criteria. As mentioned previously, this criteria may be accessed for enabling the determination of an adaption to be triggered based on the user compliance information as determined.

In step 313, the platform 103 causes, at least in part, an initiation of the adaptation of the one or more presentation parameters, the content information, or a combination thereof based, at least in part, on the at least one success rate, the at least one acceptable success rate, or a combination thereof. It is noted that the adaptation may further comprises a presentation of at least one other notification indicating (a) the success rate of the at least one maneuver, (b) at least one mistaken maneuver made by a plurality of other users, (c) at least one rate associated with the at least one mistaken maneuver made, or (d) a combination thereof. By way of example, the other notification may specify frequently made mistakes regarding a particular location, statistics regarding the success rate/compliance threshold of other users, etc.

In step 401 of process 400 (FIG. 4), the adaptation platform 103 collects other user action data following the adaptation. In step 403, the platform 103 determines at least one updated success rate, at least one updated acceptable success rate, or a combination thereof based, at least in part, on other user action data collected following the adaptation of the one or more presentation parameters, the content information, or a combination thereof. By way of example, the one or more presentation parameters include, at least in part, (a) a timing for the presentation of the at least one navigation notification before the at least one maneuver, (b) a location for the presentation of the at least one navigation notification before the at least one maneuver, or (c) a combination thereof. As noted previously, this corresponds to persistent monitoring and learning of the adaptation platform 103 for accounting for changing environmental, topographical, geological, societal or natural conditions that impact the generation of navigation notifications over time.

In step 405 of process 402, the adaptation platform 103 determines at least one detail level for the content information based, at least in part, on the user action data, the user compliance information, or a combination thereof. Of note, the adaptation of the content information is based, at least in part, on the at least one detail level. It is contemplated, in certain embodiments that the detail level may correspond to one or more preferences of the user.

Figure 5B:
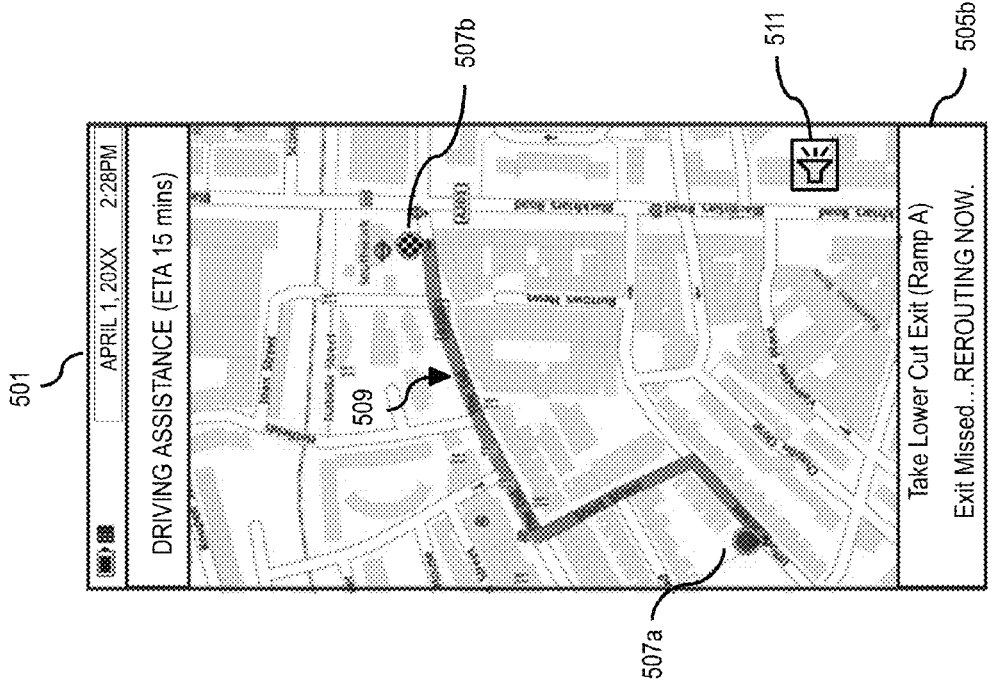
FIGS. 5A-5D are diagrams of user interfaces utilized in the processes of FIGS. 3 and 4, according to various embodiments.
Figure 5A:
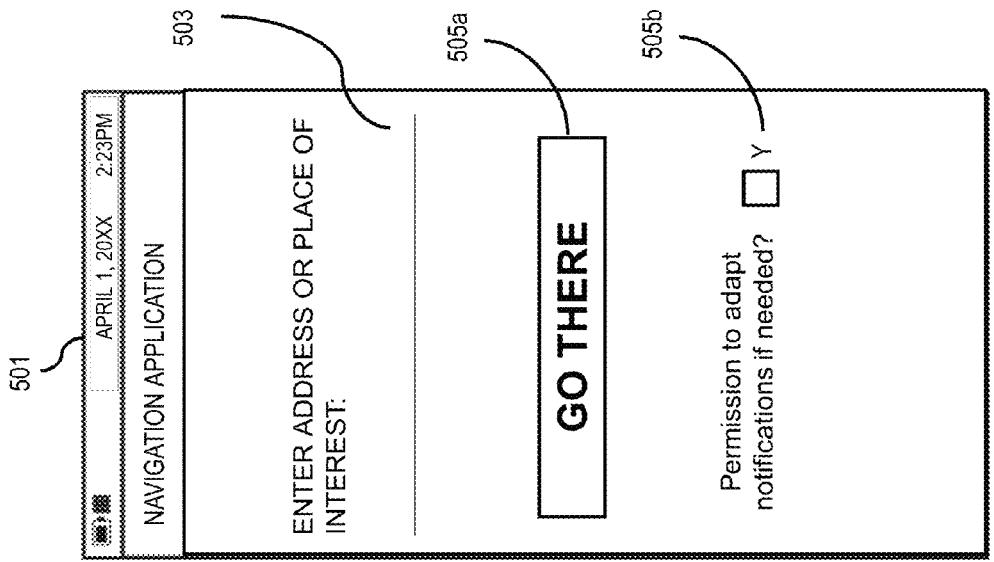
Figure 5C:
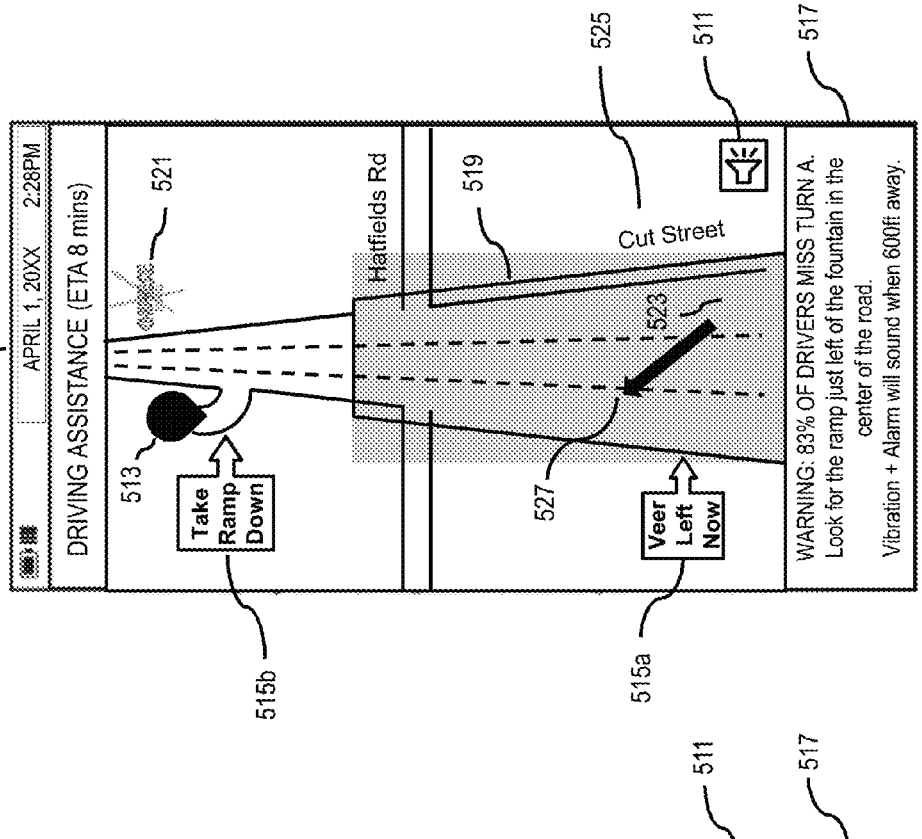

FIGS. 5A-5C are diagrams of user interfaces utilized in the processes of FIGS. 3 and 4, according to various embodiments. By way of example, the diagrams depict the user interface of a navigation application of a user device configured for interaction with the adaptation platform 103.

In FIG. 5A, the user interface 501 for the device of the user is shown. In this example, the interface 501 corresponds to a startup screen for the navigation application. The user (e.g., driver) is prompted to enter an address or place of interest they wish to navigate to via data entry field 503. In this case, the user is travelling to a lower level of a stadium (e.g., a docking area) so they enter the name "Southwark Stadium" into the data entry field 503. The user interface also features a GO THERE action button 505a for initiating and acquiring turn-by-turn navigation information from a corresponding navigation service. In addition, the user is presented with a checkbox selection option 505c for granting permission for the adaptation platform 103 to adapt subsequent notifications related to the navigation route. By selecting the checkbox, the user enables the adaptation platform to maintain user action data during navigation.

Under this scenario, when the user selects the GO THERE action button 505a, they are presented with a window (not shown) for electing to navigate to "Upper Southwark Stadium" or "Lower Southwark Stadium." In this case, the driver and passenger select "Lower Southward Stadium," which corresponds to the entrance to a docking station of the stadium. In this case, the lower stadium entrance is located along lower Cut Street, a rather obscure street that can only be accessed by way of an entrance ramp that is only accessible from a certain point along upper Cut Street. In contrast, the main entrance to the stadium is located along upper Cut Street, which is a more popular/recognizable street.

In response to the request, the adaptation platform 103 processes contextual data associated with the user device of the user, such as temporal information, current device location information, environmental information (e.g., weather), etc., as detected by way of sensor information of the mobile device. In addition, the platform 103 accesses profile information associated with the user to determine one or more user navigation notification preferences as well as determine any prior performed user actions for the user. It is noted that these executions may occur concurrent with the retrieval of the navigation information from the navigation service.

In FIG. 5B, the user interface 501 is shown in a Driving Assistance mode in response to selection of the GO THERE action button 505a. The Driving Assistance mode presents one or more graphical and/or textual elements for depicting the route to be traversed by the user including a starting point 507a and final destination point 507b (e.g., the stadium entrance along lower Cut Street). In addition, the user interface 501 presents the current date, time of travel information and expected time of arrival information.

Under this scenario, as the user approaches to within 300 feet of the ramp required to navigate to lower Cut Street, a navigation notification 509 is presented to the user interface. In addition, voice based guidance is activated, as indicated per icon 511, to provide audio alerts and instructions to the user. Despite the notification, the user accidentally drives past the entrance ramp (Ramp A) because of the obscurity of the ramp; which requires the user stay in the leftmost lane of upper Cut Street. As a result of this mishap, guidance information 505b is rendered to the user interface by the adaptation platform 103 for indicating the exit was missed. In addition, the guidance information 505b indicates that the navigation service is in the process of generating re-routing instructions. The adaptation platform 103 records the user action data corresponding to this event, which may includes current speed, location, elevation, bearing/heading data, etc.

Based on analysis of the user action data, the platform 103 determines the user action is not in compliance with the navigation notification provided the user. In this example, the success rate of the user was calculated at 50%, which per the criteria, is out of compliance with the navigation notification. In addition, the adaptation platform 103 determines that over 80% of all users miss this exit, which is significant enough per the criteria to trigger adaptation. Resultantly, the platform 103 initiates the adaptation of subsequent instances of navigation notifications for the ramp, the destination, the route, the location or a combination thereof.

In FIG. 5C, the user interface 501 of the navigation application is shown on a different occasion of the user travelling to the lower entrance of the stadium. Similarly, FIG. 5D. depicts a zoomed in, three dimensional view of the user and/or the user's vehicle as they navigate to the destination. It is noted that both interface depictions are presented subsequent to the user (or other users) having initiated the generation of one or more navigation notification adaptations based on the processing of compliance information. Resultantly, additional presentation parameters are executed during navigation for increasing the likelihood of compliance with the navigation notifications.

Figure 5D:
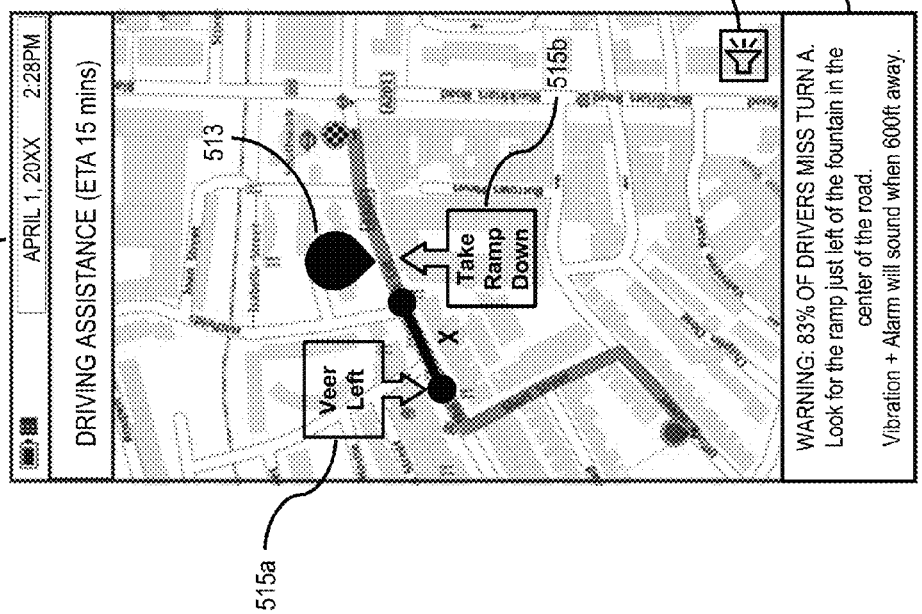

For example, a graphical element 513 is presented for depicting the exit to lower Cut Street (Ramp A). This element is presented along the navigation path as a "flashing" notification that increases in size as the user gets closer to the ramp. Also presented in FIGS. 5C and 5D are navigation notifications 515a and 515b for providing explicit driving instructions that correspond to specific points along the navigation path. In this scenario, notification 515a corresponds to a message for the user to veer to the left-most lane in order to have access to Ramp A. Another related navigation notification 515b corresponds to a message for the user to take the ramp exit accordingly and is associated with a user selected audio file (e.g., a laser beem sound) for indicating compliance. In the case of FIG. 5D, an icon 523 depicting the current position of the user's vehicle as they travel along a street 525 corresponding to Cut Street towards the destination Ramp A 513 is shown. In addition to notification 515a, per this view, an arrow 527 is also presented for indicating that the user should move into the leftmost lane.

It is noted that the placement of the notification 515 in FIG. 5C, as depicted along the navigation path, also corresponds to a distance X from Ramp A. This distance X corresponds to a recommended range in which the user is to veer into the leftmost lane. In FIG. 5D, this range is depicted as a shaded area 519. This range is determined based on feedback (e.g., prior collected user action data) by the adaptation platform 103, which indicated that users who veered into the leftmost lane of Cut Street within this distance X had a higher chance of taking the exit corresponding to Ramp A than those who did not.

Under this scenario, a persistent alert (e.g., a chime) is caused to be activated during this distance X (e.g., shaded area 519) if it is detected the user is not in the left most lane. Alternatively, an audio file as selected by the user or detected for the user may be executed as a means of alerting the user of the recommended lane change. The audio file may correspond to a frequently played song from the user's playlist, one ranked as a user favorite, or, may be based on the location of the user, etc., wherein the selection is based at least in part on contextual information regarding the user and/or the mobile device of the user. It is noted, therefore, that the adaptation platform 103 may enable the navigation application to customize the generation of navigation notifications based on the specified or determined preferences, requirements or contextual parameters associated with the user.

Also presented to the user interfaces 501 of FIGS. 5C and 5D is guidance information 517. The guidance information 517 includes details regarding previous user attempts to perform the recommended maneuver at Ramp A 513. In addition, instructions are provided including details about a landmark that the user can identify to help during navigation. For example, in FIG. 5D, an icon 521 depicting the placement of a Chinese restaurant along the navigation path is presented. In conjunction with this, the navigation guidance system may be prompted to indicate that the user passage beyond the restaurant indicates they have surpassed the ramp exit 513. Still further, the guidance information 517 indicates that a vibration and alarm mode of activation is set to activate when the user is within 600 feet of Ramp A 513. It is noted that this execution differs from the prior means of presentment of the navigation notification (e.g., per FIG. 5B) in terms of content, timing and execution of the notifications. Also, it is noted that the adaptation platform 103 continues to track the user actions and compliance information subsequent to the rendering of the navigation notifications 515a and 515b.

The processes described herein for adapting navigation notifications based on a level of compliance of users to the notifications may be implemented via software, hardware (e.g., general processor, Digital Signal Processing (DSP) chip, an Application Specific Integrated Circuit (ASIC), Field Programmable Gate Arrays (FPGAs), etc.), firmware or a combination thereof. Such exemplary hardware for performing the described functions is detailed below.

Figure 6:
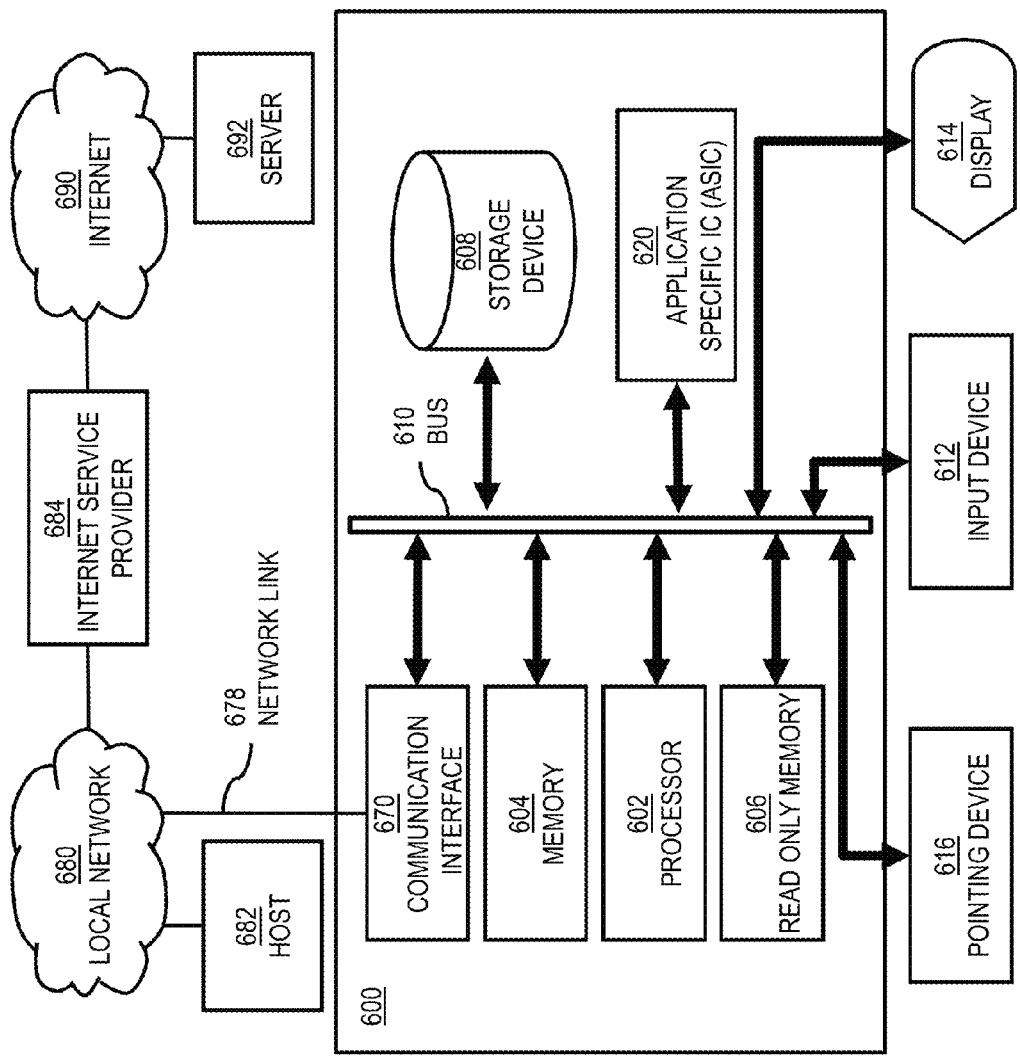
FIG. 6 is a diagram of hardware that can be used to implement an embodiment of the invention.

FIG. 6 is a diagram of a computer system that can be used to implement various exemplary embodiments. The computer system 600 includes a bus 601 or other communication mechanism for communicating information and one or more processors (of which one is shown) 603 coupled to the bus 601 for processing information. The computer system 600 also includes main memory 605, such as a random access memory (RAM) or other dynamic storage device, coupled to the bus 601 for storing information and instructions to be executed by the processor 603. Main memory 605 can also be used for storing temporary variables or other intermediate information during execution of instructions by the processor 603. The computer system 600 may further include a read only memory (ROM) 607 or other static storage device coupled to the bus 601 for storing static information and instructions for the processor 603. A storage device 609, such as a magnetic disk or optical disk, is coupled to the bus 601 for persistently storing information and instructions.

The computer system 600 may be coupled via the bus 601 to a display 611, such as a cathode ray tube (CRT), liquid crystal display, active matrix display, or plasma display, for displaying information to a computer user. An input device 613, such as a keyboard including alphanumeric and other keys, is coupled to the bus 601 for communicating information and command selections to the processor 603. Another type of user input device is a cursor control 615, such as a mouse, a trackball, or cursor direction keys, for communicating direction information and command selections to the processor 603 and for adjusting cursor movement on the display 611.

According to an embodiment of the invention, the processes described herein are performed by the computer system 600, in response to the processor 603 executing an arrangement of instructions contained in main memory 605. Such instructions can be read into main memory 605 from another computer-readable medium, such as the storage device 609. Execution of the arrangement of instructions contained in main memory 605 causes the processor 603 to perform the process steps described herein. One or more processors in a multi-processing arrangement may also be employed to execute the instructions contained in main memory 605. In alternative embodiments, hard-wired circuitry may be used in place of or in combination with software instructions to implement the embodiment of the invention. Thus, embodiments of the invention are not limited to any specific combination of hardware circuitry and software.

The computer system 600 also includes a communication interface 617 coupled to bus 601. The communication interface 617 provides a two-way data communication coupling to a network link 619 connected to a local network 621. For example, the communication interface 617 may be a digital subscriber line (DSL) card or modem, an integrated services digital network (ISDN) card, a cable modem, a telephone modem, or any other communication interface to provide a data communication connection to a corresponding type of communication line. As another example, communication interface 617 may be a local area network (LAN) card (e.g. for Ethernet™ or an Asynchronous Transfer Model (ATM) network) to provide a data communication connection to a compatible LAN. Wireless links can also be implemented. In any such implementation, communication interface 617 sends and receives electrical, electromagnetic, or optical signals that carry digital data streams representing various types of information. Further, the communication interface 617 can include peripheral interface devices, such as a Universal Serial Bus (USB) interface, a PCMCIA (Personal Computer Memory Card International Association) interface, etc. Although a single communication interface 617 is depicted in FIGS. 5A-5C, multiple communication interfaces can also be employed.

The network link 619 typically provides data communication through one or more networks to other data devices. For example, the network link 619 may provide a connection through local network 621 to a host computer 623, which has connectivity to a network 625 (e.g. a wide area network (WAN) or the global packet data communication network now commonly referred to as the "Internet") or to data equipment operated by a service provider. The local network 621 and the network 625 either use electrical, electromagnetic or optical signals to convey information and instructions. The signals through the various networks and the signals on the network link 619 and through the communication interface 617, which communicate digital data with the computer system 600, are exemplary forms of carrier waves bearing the information and instructions.

The computer system 600 can send messages and receive data, including program code, through the network(s), the network link 619, and the communication interface 617. In the Internet example, a server (not shown) might transmit requested code belonging to an application program for implementing an embodiment of the invention through the network 625, the local network 621 and the communication interface 617. The processor 603 may execute the transmitted code while being received and/or store the code in the storage device 609, or other non-volatile storage for later execution. In this manner, the computer system 600 may obtain application code in the form of a carrier wave.

The term "computer-readable medium" as used herein refers to any medium that participates in providing instructions to the processor 603 for execution. Such a medium may take many forms, including but not limited to computer-readable storage medium ((or non-transitory)—i.e., non-volatile media and volatile media), and transmission media. Non-volatile media include, for example, optical or magnetic disks, such as the storage device 609. Volatile media include dynamic memory, such as main memory 605. Transmission media include coaxial cables, copper wire and fiber optics, including the wires that comprise the bus 601. Transmission media can also take the form of acoustic, optical, or electromagnetic waves, such as those generated during radio frequency (RF) and infrared (IR) data communications. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, and EPROM, a FLASH-EPROM, any other memory chip or cartridge, a carrier wave, or any other medium from which a computer can read.

Various forms of computer-readable media may be involved in providing instructions to a processor for execution. For example, the instructions for carrying out at least part of the embodiments of the invention may initially be borne on a magnetic disk of a remote computer. In such a scenario, the remote computer loads the instructions into main memory and sends the instructions over a telephone line using a modem. A modem of a local computer system receives the data on the telephone line and uses an infrared transmitter to convert the data to an infrared signal and transmit the infrared signal to a portable computing device, such as a personal digital assistant (PDA) or a laptop. An infrared detector on the portable computing device receives the information and instructions borne by the infrared signal and places the data on a bus. The bus conveys the data to main memory, from which a processor retrieves and executes the instructions. The instructions received by main memory can optionally be stored on storage device either before or after execution by processor.

FIG. 7 illustrates a chip set or chip 700 upon which an embodiment of the invention may be implemented. Chip set 700 is programmed to adapt navigation notifications based on a level of compliance of users to the notifications as described herein and includes, for instance, the processor and memory components described with respect to FIG. 6 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set 700 can be implemented in a single chip. It is further contemplated that in certain embodiments the chip set or chip 700 can be implemented as a single "system on a chip." It is further contemplated that in certain embodiments a separate ASIC would not be used, for example, and that all relevant functions as disclosed herein would be performed by a processor or processors. Chip set or chip 700, or a portion thereof, constitutes a means for performing one or more steps of adapting navigation notifications based on a level of compliance of users to the notifications.

In one embodiment, the chip set or chip 700 includes a communication mechanism such as a bus 701 for passing information among the components of the chip set 700. A processor 703 has connectivity to the bus 701 to execute instructions and process information stored in, for example, a memory 705. The processor 703 may include one or more processing cores with each core configured to perform independently. A multi-core processor enables multiprocessing within a single physical package. Examples of a multi-core processor include two, four, eight, or greater numbers of processing cores. Alternatively or in addition, the processor 703 may include one or more microprocessors configured in tandem via the bus 701 to enable independent execution of instructions, pipelining, and multithreading. The processor 703 may also be accompanied with one or more specialized components to perform certain processing functions and tasks such as one or more digital signal processors (DSP) 707, or one or more application-specific integrated circuits (ASIC) 709. A DSP 707 typically is configured to process real-world signals (e.g., sound) in real time independently of the processor 703. Similarly, an ASIC 709 can be configured to performed specialized functions not easily performed by a more general purpose processor. Other specialized components to aid in performing the inventive functions described herein may include one or more field programmable gate arrays (FPGA) (not shown), one or more controllers (not shown), or one or more other special-purpose computer chips.

In one embodiment, the chip set or chip 700 includes merely one or more processors and some software and/or firmware supporting and/or relating to and/or for the one or more processors.

The processor 703 and accompanying components have connectivity to the memory 705 via the bus 701. The memory 705 includes both dynamic memory (e.g., RAM, magnetic disk, writable optical disk, etc.) and static memory (e.g., ROM, CD-ROM, etc.) for storing executable instructions that when executed perform the inventive steps described herein to adapt navigation notifications based on a level of compliance of users to the notifications. The memory 705 also stores the data associated with or generated by the execution of the inventive steps.

Figure 8:
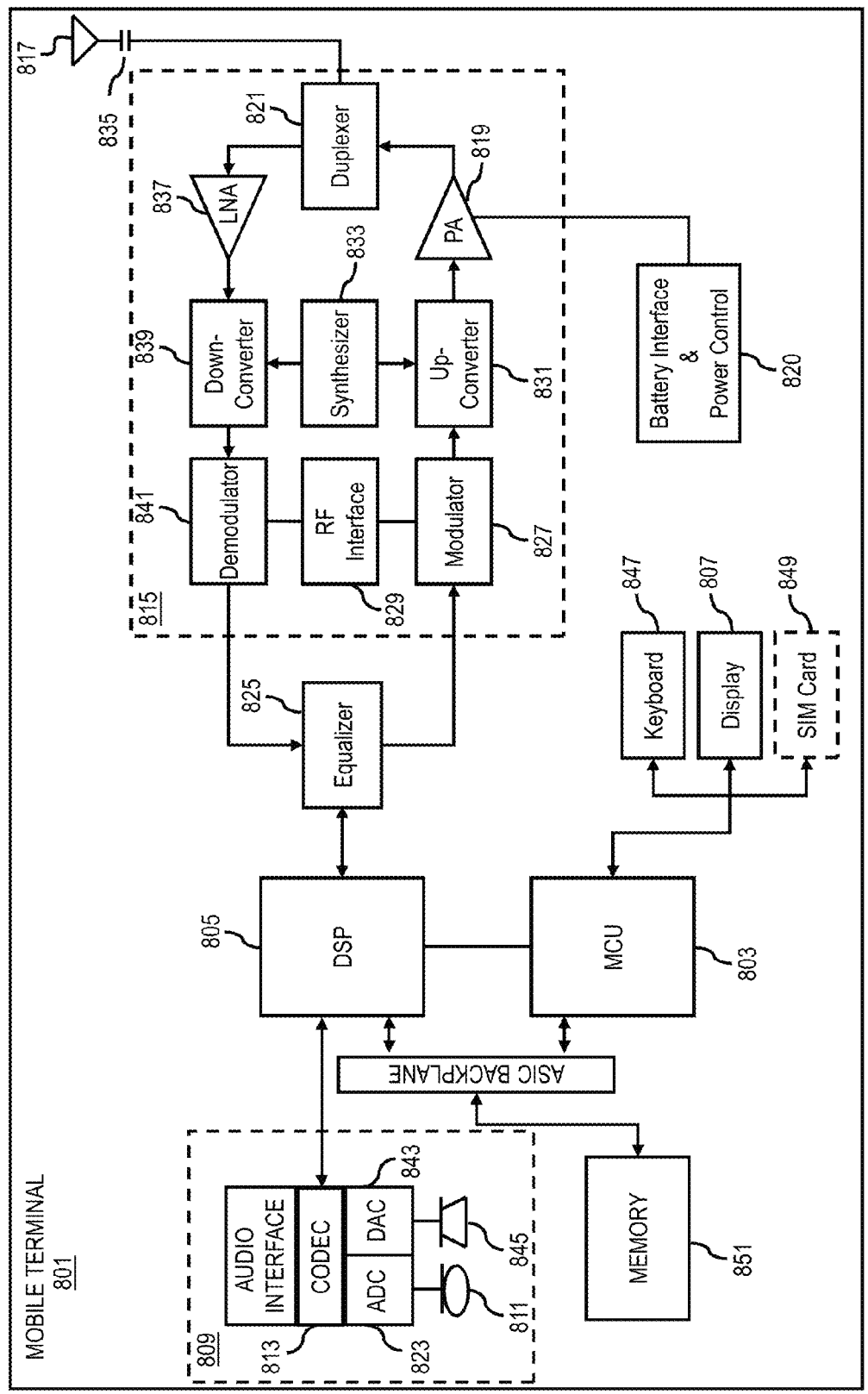
FIG. 8 is a diagram of a mobile terminal (e.g., handset) that can be used to implement an embodiment of the invention.

FIG. 8 is a diagram of exemplary components of a mobile terminal (e.g., handset) for communications, which is capable of operating in the system of FIG. 1, according to one embodiment. In some embodiments, mobile terminal 801, or a portion thereof, constitutes a means for performing one or more steps of adapting navigation notifications based on a level of compliance of users to the notifications. Generally, a radio receiver is often defined in terms of front-end and back-end characteristics. The front-end of the receiver encompasses all of the Radio Frequency (RF) circuitry whereas the back-end encompasses all of the base-band processing circuitry. As used in this application, the term "circuitry" refers to both: (1) hardware-only implementations (such as implementations in only analog and/or digital circuitry), and (2) to combinations of circuitry and software (and/or firmware) (such as, if applicable to the particular context, to a combination of processor(s), including digital signal processor(s), software, and memory(ies) that work together to cause an apparatus, such as a mobile phone or server, to perform various functions). This definition of "circuitry" applies to all uses of this term in this application, including in any claims. As a further example, as used in this application and if applicable to the particular context, the term "circuitry" would also cover an implementation of merely a processor (or multiple processors) and its (or their) accompanying software/or firmware. The term "circuitry" would also cover if applicable to the particular context, for example, a baseband integrated circuit or applications processor integrated circuit in a mobile phone or a similar integrated circuit in a cellular network device or other network devices.

Pertinent internal components of the telephone include a Main Control Unit (MCU) 803, a Digital Signal Processor (DSP) 805, and a receiver/transmitter unit including a microphone gain control unit and a speaker gain control unit. A main display unit 807 provides a display to the user in support of various applications and mobile terminal functions that perform or support the steps of adapting navigation notifications based on a level of compliance of users to the notifications. The display 807 includes display circuitry configured to display at least a portion of a user interface of the mobile terminal (e.g., mobile telephone). Additionally, the display 807 and display circuitry are configured to facilitate user control of at least some functions of the mobile terminal. An audio function circuitry 809 includes a microphone 811 and microphone amplifier that amplifies the speech signal output from the microphone 811. The amplified speech signal output from the microphone 811 is fed to a coder/decoder (CODEC) 813.

A radio section 815 amplifies power and converts frequency in order to communicate with a base station, which is included in a mobile communication system, via antenna 817. The power amplifier (PA) 819 and the transmitter/modulation circuitry are operationally responsive to the MCU 803, with an output from the PA 819 coupled to the duplexer 821 or circulator or antenna switch, as known in the art. The PA 819 also couples to a battery interface and power control unit 820.

In use, a user of mobile terminal 801 speaks into the microphone 811 and his or her voice along with any detected background noise is converted into an analog voltage. The analog voltage is then converted into a digital signal through the Analog to Digital Converter (ADC) 823. The control unit 803 routes the digital signal into the DSP 805 for processing therein, such as speech encoding, channel encoding, encrypting, and interleaving. In one embodiment, the processed voice signals are encoded, by units not separately shown, using a cellular transmission protocol such as enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wideband code division multiple access (WCDMA), wireless fidelity (WiFi), satellite, and the like, or any combination thereof.

The encoded signals are then routed to an equalizer 825 for compensation of any frequency-dependent impairments that occur during transmission though the air such as phase and amplitude distortion. After equalizing the bit stream, the modulator 827 combines the signal with a RF signal generated in the RF interface 829. The modulator 827 generates a sine wave by way of frequency or phase modulation. In order to prepare the signal for transmission, an up-converter 831 combines the sine wave output from the modulator 827 with another sine wave generated by a synthesizer 833 to achieve the desired frequency of transmission. The signal is then sent through a PA 819 to increase the signal to an appropriate power level. In practical systems, the PA 819 acts as a variable gain amplifier whose gain is controlled by the DSP 805 from information received from a network base station. The signal is then filtered within the duplexer 821 and optionally sent to an antenna coupler 835 to match impedances to provide maximum power transfer. Finally, the signal is transmitted via antenna 817 to a local base station. An automatic gain control (AGC) can be supplied to control the gain of the final stages of the receiver. The signals may be forwarded from there to a remote telephone which may be another cellular telephone, any other mobile phone or a land-line connected to a Public Switched Telephone Network (PSTN), or other telephony networks.

Voice signals transmitted to the mobile terminal 801 are received via antenna 817 and immediately amplified by a low noise amplifier (LNA) 837. A down-converter 839 lowers the carrier frequency while the demodulator 841 strips away the RF leaving only a digital bit stream. The signal then goes through the equalizer 825 and is processed by the DSP 805. A Digital to Analog Converter (DAC) 843 converts the signal and the resulting output is transmitted to the user through the speaker 845, all under control of a Main Control Unit (MCU) 803 which can be implemented as a Central Processing Unit (CPU).

The MCU 803 receives various signals including input signals from the keyboard 847. The keyboard 847 and/or the MCU 803 in combination with other user input components (e.g., the microphone 811) comprise a user interface circuitry for managing user input. The MCU 803 runs a user interface software to facilitate user control of at least some functions of the mobile terminal 801 to adapt navigation notifications based on a level of compliance of users to the notifications. The MCU 803 also delivers a display command and a switch command to the display 807 and to the speech output switching controller, respectively. Further, the MCU 803 exchanges information with the DSP 805 and can access an optionally incorporated SIM card 849 and a memory 851. In addition, the MCU 803 executes various control functions required of the terminal. The DSP 805 may, depending upon the implementation, perform any of a variety of conventional digital processing functions on the voice signals. Additionally, DSP 805 determines the background noise level of the local environment from the signals detected by microphone 811 and sets the gain of microphone 811 to a level selected to compensate for the natural tendency of the user of the mobile terminal 801.

The CODEC 813 includes the ADC 823 and DAC 843. The memory 851 stores various data including call incoming tone data and is capable of storing other data including music data received via, e.g., the global Internet. The software module could reside in RAM memory, flash memory, registers, or any other form of writable storage medium known in the art. The memory device 851 may be, but not limited to, a single memory, CD, DVD, ROM, RAM, EEPROM, optical storage, magnetic disk storage, flash memory storage, or any other non-volatile storage medium capable of storing digital data.

An optionally incorporated SIM card 849 carries, for instance, important information, such as the cellular phone number, the carrier supplying service, subscription details, and security information. The SIM card 849 serves primarily to identify the mobile terminal 801 on a radio network. The card 849 also contains a memory for storing a personal telephone number registry, text messages, and user specific mobile terminal settings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

While certain exemplary embodiments and implementations have been described herein, other embodiments and modifications will be apparent from this description. Accordingly, the invention is not limited to such embodiments, but rather to the broader scope of the presented claims and various obvious modifications and equivalent arrangements.

What is claimed is:

1. A method comprising:
    determining user action data following a rendering of at least one navigation notification at at least one device;
    processing and/or facilitating a processing of the user action data to determine user compliance information with the at least one navigation notification; and
    causing, at least in part, an adaptation of (a) one or more rendering parameters for the rendering of the at least one navigation notification, (b) content information for the at least one navigation notification, or (c) a combination thereof based, at least in part, on the compliance information and a success rate of other users corresponding to the at least one navigation notification,
    wherein the adaptation is used for one or more subsequent renderings of the at least one navigation notification, and
    the one or more rendering parameters include, at least in part, (a) a timing for the rendering of the at least one navigation notification before the at least one maneuver, (b) a location for the rendering of the at least one navigation notification before the at least one maneuver, or (c) a combination thereof.

2. A method of claim 1, wherein the user action data includes, at least in part, dynamic location data associated with the at least one device, data indicating one or more user interactions with the at least one device, or a combination thereof.

3. A method of claim 1, further comprising:
    processing and/or facilitating a processing of the user action data to determine at least one indicator that at least one maneuver specified by the at least one navigation notification has been missed,
    wherein the user compliance information is further based, at least in part, on the at least one indicator.

4. A method of claim 3, further comprising:
    processing and/or facilitating a processing of the user action data to determine that a user has missed the at least one maneuver, triggered at least one re-routing event, made a U-turn, returned to at least one previous location, or a combination thereof,
    wherein the at least one indicator includes, at least in part, the at least one missed maneuver, the at least one triggered re-routing event, or a combination thereof.

5. A method of claim 3, further comprising:
    processing and/or facilitating a processing of the user action data to determine at least one success rate, at least one acceptable success rate, or a combination thereof for the at least one maneuver;

causing, at least in part, an initiation of the adaptation of the one or more rendering parameters, the content information, or a combination thereof based, at least in part, on the at least one success rate, the at least one acceptable success rate, or a combination thereof.

6. A method of claim 5, wherein the adaptation further comprises a presentation of at least one other notification indicating (a) the success rate of the at least one maneuver, (b) at least one mistaken maneuver made by a plurality of other users, (c) at least one rate associated with the at least one mistaken maneuver made, or (d) a combination thereof.

7. A method of claim 5, further comprising:
causing, at least in part, a collection of other user action data following the adaptation; and
determining at least one updated success rate, at least one updated acceptable success rate, or a combination thereof based, at least in part, on other user action data collected following the adaptation of the one or more presentation parameters, the content information, or a combination thereof.

8. A method of claim 1, further comprising:
determining at least one detail level for the content information based, at least in part, on the user action data, the user compliance information, or a combination thereof,
wherein the adaptation of the content information is based, at least in part, on the at least one detail level.

9. A method comprising facilitating creating and/or facilitating modifying (1) at least one device user interface element and/or (2) at least one device user interface functionality, the (1) at least one device user interface element and/or (2) at least one device user interface functionality based, at least in part, on the method of claim 1.

10. An apparatus comprising:
at least one processor; and
at least one memory including computer program code for one or more programs, the at least one memory and the computer program code configured to, with the at least one processor, cause the apparatus to perform at least the following:
determine user action data following a presentation of at least one navigation notification at at least one device;
process and/or facilitate a processing of the user action data to determine user compliance information with the at least one navigation notification; and
cause, at least in part, an adaptation of (a) one or more presentation parameters for the presentation of the at least one navigation notification, (b) content information for the at least one navigation notification, or (c) a combination thereof based, at least in part, on the compliance information and a success rate of other users corresponding to the at least one navigation notification,
wherein the adaptation is used for one or more subsequent presentations of the at least one navigation notification, and
the one or more rendering parameters include, at least in part, (a) a timing for the rendering of the at least one navigation notification before the at least one maneuver, (b) a location for the rendering of the at least one navigation notification before the at least one maneuver, or (c) a combination thereof.

11. An apparatus of claim 10, wherein the user action data includes, at least in part, dynamic location data associated with the at least one device, data indicating one or more user interactions with the at least one device, or a combination thereof.

12. An apparatus of claim 10, wherein the apparatus is further caused to:
process and/or facilitate a processing of the user action data to determine at least one indicator that at least one maneuver specified by the at least one navigation notification has been missed,
wherein the user compliance information is further based, at least in part, on the at least one indicator.

13. An apparatus of claim 12, wherein the apparatus is further caused to:
process and/or facilitate a processing of the user action data to determine that a user has missed the at least one maneuver, triggered at least one re-routing event, made a U-turn, returned to at least one previous location, or a combination thereof,
wherein the at least one indicator includes, at least in part, the at least one missed maneuver, the at least one triggered re-routing event, or a combination thereof.

14. An apparatus of claim 12, wherein the apparatus is further caused to:
process and/or facilitate a processing of the user action data to determine at least one success rate, at least one acceptable success rate, or a combination thereof for the at least one maneuver;
cause, at least in part, an initiation of the adaptation of the one or more presentation parameters, the content information, or a combination thereof based, at least in part, on the at least one success rate, the at least one acceptable success rate, or a combination thereof.

15. An apparatus of claim 14, wherein the adaptation further comprises a presentation of at least one other notification indicating (a) the success rate of the at least one maneuver, (b) at least one mistaken maneuver made by a plurality of other users, (c) at least one rate associated with the at least one mistaken maneuver made, or (d) a combination thereof.

16. An apparatus of claim 14, wherein the apparatus is further caused to:
cause, at least in part, a collection other user action data following the adaptation; and
determine at least one updated success rate, at least one updated acceptable success rate, or a combination thereof based, at least in part, on other user action data collected following the adaptation of the one or more presentation parameters, the content information, or a combination thereof.

17. An apparatus of claim 10, wherein the apparatus is further caused to:
determine at least one detail level for the content information based, at least in part, on the user action data, the user compliance information, or a combination thereof,
wherein the adaptation of the content information is based, at least in part, on the at least one detail level.

18. An apparatus of claim 10, wherein the apparatus is a mobile phone further comprising: user interface circuitry and user interface software configured to facilitate user control of at
least some functions of the mobile phone through use of a display and configured to respond to user input; and
a display and display circuitry configured to display at least a portion of a user interface of the mobile phone, the display and display circuitry configured to facilitate user control of at least some functions of the mobile phone.

19. A non-transitory computer-readable storage medium carrying one or more sequences of one or more instructions which, when executed by one or more processors, cause an apparatus to perform at least the following:
- determine user action data following a presentation of at least one navigation notification at at least one device;
- process and/or facilitate a processing of the user action data to determine user compliance information with the at least one navigation notification; and
- cause, at least in part, an adaptation of (a) one or more presentation parameters for the presentation of the at least one navigation notification, (b) content information for the at least one navigation notification, or (c) a combination thereof based, at least in part, on the compliance information and a success rate of other users corresponding to the at least one navigation notification,
- wherein the adaptation is used for one or more subsequent presentations of the at least one navigation notification, and
- the one or more rendering parameters include, at least in part, (a) a timing for the rendering of the at least one navigation notification before the at least one maneuver, (b) a location for the rendering of the at least one navigation notification before the at least one maneuver, or (c) a combination thereof.

\* \* \* \* \*